United States Patent

[11] 3,548,124

[72] Inventors  Elmer Tollerud
               1602 East Ave., Crete, Ill. 60417;
               Leonard H. Johnston, Jr., Tamarack,
               Minn. 55787
[21] Appl. No. 729,251
[22] Filed     May 15, 1970
[45] Patented  Dec. 15, 1970

[54] PROLONGED-ACTION STOP-LIGHT SWITCHES
     6 Claims, 5 Drawing Figs.
[52] U.S. Cl........................... 200/34,
                                    188/1, 60/54.5, 340/71
[51] Int. Cl........................... H01h 7/02,
                                        H01h 43/04
[50] Field of Search........................ 200/33, 34;
                      188/1A; 60/54.5E, 54.6E; 340/71, 239

[56]                References Cited
                UNITED STATES PATENTS
2,134,902  11/1938  White............................ 340/71
2,666,103   1/1954  Price............................ 200/34
2,891,234   6/1959  Hague......................... 188/1(A)(X)
3,108,252  10/1963  Torres........................... 340/71
3,414,879  12/1968  Holland.......................... 340/71

Primary Examiner—H. O. Jones
Attorney—Stevens, Lehrer & Stevens

ABSTRACT: A unit adapted to receive pressure brake fluid from the master cylinder of a motor car braking system. Foot pressure on the brake pedal advances the fluid in the unit by backing a check valve in the entrance of the same. The further flow of the fluid advances a plunger against the resistance of an outer spring. An inner spring carried by the plunger then bears against the closing blade of a stop light switch to operate the stop light. When the release of the brake pedal relieves the fluid pressure the check valve closes. However, a narrow passage in the check valve allows the fluid to bypass the same on the return at a retarded rate, maintaining the engagement of the inner spring with the closed switch blade to prolong the operation of the stoplight.

PATENTED DEC 15 1970
3,548,124
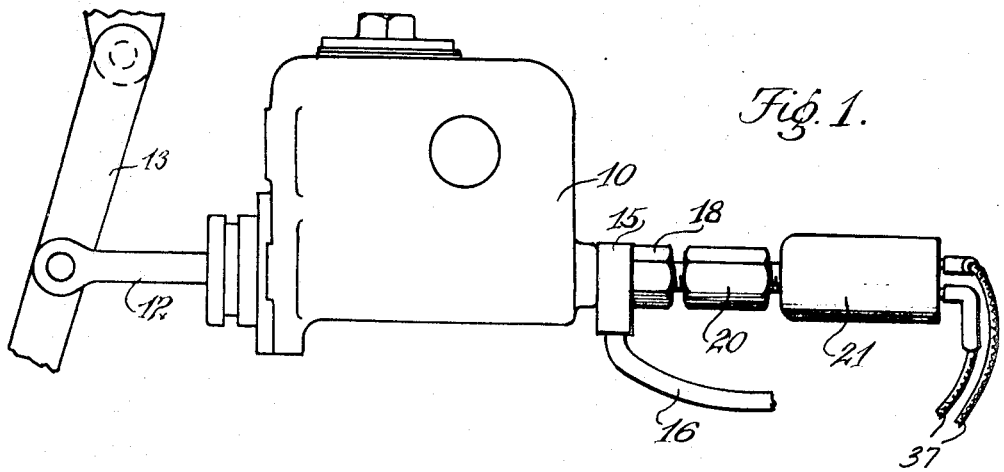
Fig. 1.
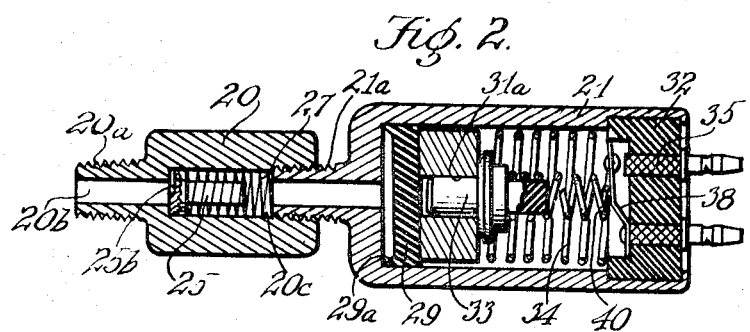
Fig. 2.
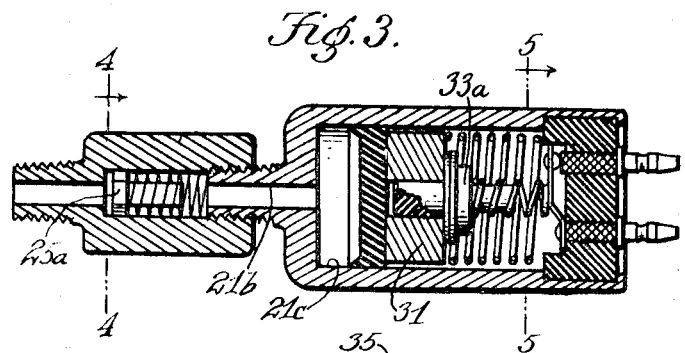
Fig. 3.
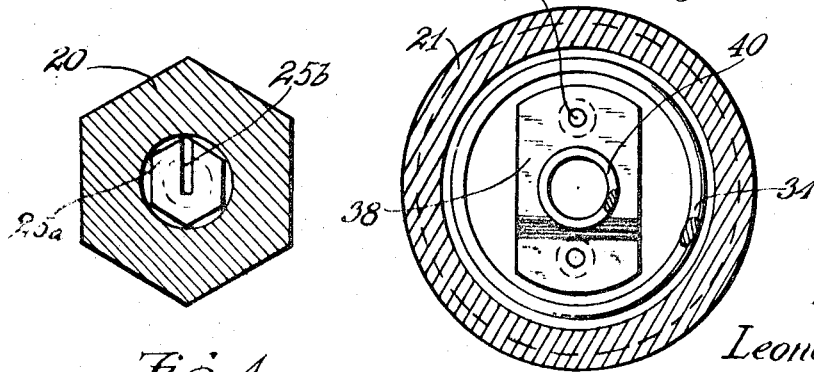
Fig. 4.
Fig. 5.
Inventors.
Elmer Tollerud
Leonard H. Johnston, Jr.
By Stevens, Lehrer & Stevens
Attorneys.

PROLONGED-ACTION STOP-LIGHT SWITCHES

Our invention relates to motor car stoplights, and more particularly to controls for the same. The conventional control is the brake pedal, and the stoplight remains in action as long as such pedal is in a depressed position. A pedal so held is an indication that the car is slowing down to a stop. Motor cars are also equipped with turn signals, these being controlled independently of the brakes. Usually, a turn signal in action conveys the indication that the car is keeping in motion, but in a turning direction. Often a driver intending to turn also slows down, using the brake pedal in stop-and-go fashion—called "pumping the brake"—to carefully retard the movement of the car. The steady turn signal implies to drivers from the rear that the car ahead will keep moving, and not necessarily slowing down or coming to a stop. If this occurs, however, the driver behind may follow too close and even collide with the car ahead.

The present invention has for its main object to prevent close calls or rear end collisions by providing means for prolonging the action of the stoplight when the brake pedal is pressed in stop-and-go fashion during cautious or slippery driving, or preparatory to a turn, so that a steady warning is given to drivers behind.

A further object is to replace the conventional stoplight switch with a unit which fits in front of the master brake cylinder, such unit containing the prolonged action stoplight control.

Another object is to provide a control unit of the character mentioned which is automatic, fully enclosed, and permanently lubricated.

A better understanding of the invention may be gained by reference to the accompanying drawing, in which:

FIG. 1 is a side elevation of a typical master cylinder installation, with the novel stoplight control unit attached;

FIG. 2 is an enlarged longitudinal section of the unit when not actuated by pressure from the brake pedal to close a stoplight switch;

FIG. 3 is a similar view with the unit subjected to such pressure, and the switch to operate the stoplight closed; and FIGS. 4 and 5 are, respectively, further enlarged sections taken on the lines 4-4 and 5-5 of FIG. 3.

Referring specifically to the drawing, 10 denotes a typical master cylinder for motor car brake systems, the cylinder receiving a plunger rod 12 operated by a pedal lever 13 from the rear. In front the cylinder receives an outlet fitting 15 from which conductors 16 lead to the brakes of the motor car wheels.

For the purpose of the present invention the fitting 15 is also extended with a forward outlet in the form of a tapped receptacle 18. The novel control unit is composed of two sections, one being a valve cylinder 20, and the other a switch cylinder 21; and the cylinders are arranged in line, as shown. The valve cylinder has a nipple 20$a$ extending from one end to fit into the receptacle 18; and the switch cylinder is extended likewise with a nipple 21$a$ fitted into the tapped other end of the valve cylinder.

The valve cylinder has an inlet passage 20$b$ opening into a larger chamber 20$c$. A fluid pressure responsive check valve means 25 in the chamber is movable to seat its head 25$a$ against the shoulder of the passage 20$b$. The head is hexagonal and in sliding contact with the wall of the chamber for the horizontal support of the valve. The head is backed by a spring 27 to seat as stated, forms passages along its peripheral flats, and has a radial face slot 25$b$.

The nipple 21$a$ is also made with an inlet passage 21$b$ leading into a large cylindrical chamber 21$c$, the first part therein being a fluid pressure operated actuator or plunger 29 of plastic material formed with a beveled end flange 29$a$ on the side facing the passage 21$b$ in order to secure a marginal fit under pressure. The plunger is backed by a metal washer 31. A disc 32 of insulating material is retentively lodged in the opposite end of the chamber 21$c$; and a sturdy coil spring 34 extends between the washer 31 and the disc 32.

The washer 31 is bored in the center as indicated at 31$a$ to receive one end portion of a pin 33 of insulating material extending in the center of the chamber 21$c$. The intermediate portion of the pin is in the form of a collar 33$a$. The disc 32 is bored for a pair of diametrically spaced switch terminals 35 whose outer ends receive a pair of electrical conductors 37 (see FIG. 1) leading to the motor car stoplight (not shown). Inside the chamber 21$c$ one terminal 35 carries a spring blade 38 which is normally spaced from the other terminal as shown in FIG. 2. The other end portion of the pin 33 carries a light coil spring 40 which is extended to end close to the blade 38, as shown in the same FIG.

When the brake system is inactive the fluid from the master cylinder 10 fills the passage 20$b$ and chamber 20$c$ of the valve cylinder, and the passage 21$b$ and chamber 21$c$ of the switch cylinder up to the plunger 29. Since the switch blade 38 is open—as seen in FIG. 2—the stoplight is of course inactive. Should momentary pressure be applied to the brake pedal of the motor car, the forced advance of the braking fluid in the passage 21$b$ will back the valve 25 and allow the fluid to impinge on the plunger 29 against the resistance of the spring 34. At the same time the central spring 40 will impinge gently on the switch blade 38, causing the same to contact the other stoplight switch terminal 35. This puts the stoplight into action, the changed positions of the parts in the chamber 21$c$ being shown in FIG. 3.

In case the pressure on the brake pedal is momentarily released, the response of the spring 34 will be to force the return of the plunger 29 and reverse the flow of the braking fluid for return to the master cylinder. However, this flow will close the valve 25; and the latter will check the flow except for a narrow bypass through the slot 25$b$. The return of the plunger will thus be delayed, allowing the inner spring 40 to keep the switch 38 closed and the stoplight in action for a short period—such as a number of seconds—while there is no pressure on the brake pedal.

It is now apparent that the novel control unit serves to maintain the operation of the stoplight during stop-and-go driving either in traffic, along a slippery pavement, or preparatory to a turn. In the latter case the blinking of the turn signals will not have to be an indication of slowing down, but serve its own purpose to indicate the change of direction. However, the independent maintenance of the stoplight in action as a slowing down indication will caution drivers behind to maintain a safe distance. Further, the parts of the control unit are fully enclosed and lubricated by the fluid content of the unit. Further, while the two cylinders thereof could be made in one for compactness, it is of advantage to make the valve cylinder separate for quick access to insert or remove the internal valve 25 and spring 27. Further, the purpose of the metal washer 31 is to secure the packing advantage of the flexible nonmetallic plunger 29 with a solid backing which prevents the distortion of the plunger. Further, the disc 32 is shown snapped into the end of the switch cylinder, this being a familiar practice to save parts. Finally, the construction of the control unit is simple; and it is designed as a convenient and improved replacement of the conventional stoplight switch.

We claim:

1. A prolonged action control switch for braking systems including a master cylinder means, comprising:

means comprising a valve chamber and switch chamber connected in series;

said valve chamber including means for communicating with fluid pressure upstream of said switch chamber, said switch chamber including normally open electrical switch means for operating a signal;

a fluid pressure-operated actuator in said switch chamber and including a portion responsive to fluid pressure for closing said electrical switch means;

said valve chamber including a fluid pressure-responsive check valve means for permitting fluid pressure to be directed to said fluid pressure-operated actuator; and said fluid pressure-responsive check valve means including fluid pressure bleed means for trapping return pressure and delaying return of said electrical switch means to a normally open condition until return pressure is neutralized in the system.

2. The structure as claimed in claim 1 in which said valve chamber reciprocally supports said fluid check valve and reciprocably guides the same, said fluid pressure-responsive check valve means including a head portion including at least one peripheral flat and defining said bleed means.

3. The structure as claimed in claim 2 including a spring in said valve chamber and normally urging said fluid pressure-responsive check valve means axially toward a seated position in said valve chamber.

4. The structure as claimed in claim 1 in which said valve and switch chambers comprise axially spaced housings, and an axial nipple on each of said housings for connecting the housings to each other and into said system.

5. The structure as claimed in claim 1 in which said fluid pressure-operated actuator includes a plunger normally urged away from said electrical switch means, an insulated spring extending axially from said plunger and in engagement with said electrical switch means.

6. The structure as claimed in claim 5 in which said electrical switch means comprise a pair of conductors seated in one end of said switch chamber and comprising terminal contacts in said switch chamber, said electrical switch means including a switch blade connected to one of said terminal contacts and engageable with the other to close a circuit when said fluid pressure-operated actuator is moved to an operative position due to increased operating pressure.